Jan. 18, 1966     D. B. PALL ETAL     3,229,719
PNEUMATIC ROTARY GAS VALVE Filed May 6, 1963     9 Sheets-Sheet 6

United States Patent Office 3,229,719
Patented Jan. 18, 1966

1

3,229,719
PNEUMATIC ROTARY GAS VALVE
David B. Pall, Roslyn Estates, John E. Alzmann, Carle Place, and Mathias P. L. Siebel, Roslyn, N.Y., assignors to Pall Corporation, Glen Cove, N.Y., a corporation of New York
Filed May 6, 1963, Ser. No. 278,030
15 Claims. (Cl. 137—624.15)

This invention relates to pneumatic rotary fluid valves and particularly to multiport rotary valves which are fluid-timed, and also self-indexing, and which include an exhaust valve of a self-closing type.

U.S. Patent Nos. 2,944,627 to C. W. Skarstrom and 3,069,830 to C. W. Skarstrom and W. O. Heilman, which issued on July 12, 1960 and December 25, 1962, respectively, describe an apparatus for fractionating gaseous mixtures employing two tanks, of which one is normally on stream, in a cycle called the adsorption cycle, because it removes by adsorption a selected component from a gas mixture, while the other is on the desorption cycle, i.e., it is being regenerated by passing through it a portion of the effluent from the fractionating tank. When the cycle is complete, the influent gaseous mixture is then diverted to the tank just regenerated, using appropriate valving.

The Skarstrom process is operated without application of heat, and this is achieved by carrying out the fractionation or adsorption at a superatmospheric pressure, while carrying out the desorption or regeneration at atmospheric pressure. In order to conserve for desorption the heat evolved on adsorption, very short cycles are employed, generally not exceeding two or three minutes, and preferably less than one minute. Thus, the influent gaseous mixture is very frequently shifted from the one tank to the other, and at the end of each cycle the pressure of gas in each tank must be rapidly adjusted to the proper pressure for adsorptoin or for desorption, as required.

Accordingly, Skarstrom provides a group of valves for this purpose, which are equipped for automatic operation by means of a cycle timing device. Such devices, however, require a source of electricity, which is not always available, and if it is, is subject to power failures, and they also increase the cost of operation of the apparatus. Furthermore, they constitute a complicated component which can fail, and when it does, can upset the cyclic operation.

In accordance with the invention, there is provided a pneumatic multiport valve which is fluid-timed by the effluent fluid from the adsorption or fractionating tank, and hence requires no power supply or timer. The timing mechanism and flow controls can be automatically set to provide the necessary adjustment of the pressure of the tank in changing from the adsorption to desorption cycles, and vice versa, as well as to provide for a suitable cycle for the repressurization and adsorption and desorption operations. The valve is also self-indexing, and proceeds automatically from one position to the next successive position.

The valve of the invention has a ported rotor which connects selected passages in a housing for fluid flow in a series of chosen combinations in its rotation between successive positions. One embodiment of rotor, particularly designed as a gas valve is of the rotary shear plate type, the ported rotary plate shearing across the seal of the valve in its rotation between successive positions. Two rotary plates are desirable, one for directing flow of influent gas, and one for directing flow of effluent gas. The number of ports in each plate will depend on the number of tanks, and the number of operations to be controlled. For a two tank dryer, the rotary plates preferably have four 90° positions, but the number of plate positions can of course be varied to meet any special requirements, and

2 a single plate can be used to direct flow in one, two or more tanks, as required.

Another embodiment of rotor adapted for gas or liquid flow is cylindrical, rotating within a ported cylindrical housing. A single rotor is sufficient to direct flow of influent fluid and effluent fluid for one tank or between two tanks. For a two tank dryer, the rotor cylinder has four 90° positions, but the number of plate positions can of course be varied as required, and a single rotor cylinder can direct flow in more than two tanks, if required.

The valve of the invention is operated by fluid pressure reciprocation of a piston between two spaced positions. Movement of the piston in either direction of reciprocation is obtained by fluid pressure on one side, the pressure being supplied by fluid effluent from the tank or tanks with which it is used. The reciprocating piston operates a lever arm which, at predetermined positions of the piston, actuates rotation of a rotary shear plate through the required arc to the next successive position. The time required for the piston to reach that position from the zero point of the stroke is controlled by control of the effluent fluid flow operating the piston. In this way, the time of a cycle is easily adjusted, as needed.

Provision is made for supplementing normal fluid flow to the piston when a short cycle is desired, so that any combination of long and short cycles can be furnished.

Reciprocation of the piston between two positions requires alternating application of fluid pressure to one side and venting of fluid on the other side of the piston, and this in turn requires an exhaust valve. While any type of exhaust valve can be used, the invention provides a reciprocating poppet valve of novel construction, in which the poppet of the valve is operated between closed and open positions by movement of a stressed Belleville spring disc. At the closed position of the valve, the Belleville spring disc preferably is loaded to a point of deflection in its actuating force deflection curve on the positive load side, just short of the point where the curve changes slope, and the disc deflects with a negative load. At the maximum open position of the valve, the disc is still on the negative load side of the curve, short of the zero deflection point, so that it will return to normal closed position immediately after the pressure has been reduced to the predetermined normal level. The disc is constrained between these positions by stops. Valves of this type are frictionless, and dirt-insensitive, important advantages in a fluid system.

The valves shown in the figures are designed to be used with a two tank dryer, composed either of two separate tanks, or of one vessel divided by a partition into two tanks. The valve of FIGURES 1 to 10 is a gas valve, so arranged that all tank connections on one side of the line P—P of FIGURE 7 go to one tank, arbitrarily designated tank I, and all tank connections on the other side of line P—P go to the other tank, tank II. The valve itself is divided into two parts, a dry gas part and a wet gas part, separated by the line D–W of FIGURE 7. The flow of wet gas influent is controlled in the wet part, and the flow of dry gas effluent is controlled in the dry gas part. The valve of FIGURES 11 to 14 is a gas or liquid valve, so arranged that all tank connections on one side of the line 12—12 of FIGURE 11 go to one tank, arbitrarily designated tank III, and all tank connections on the other side of line 12—12 go to the other tank, tank IV. The valve itself is divided into two parts, a dry gas part and a wet gas part, separated by a line midway between the lines 14—14 and 15—15 of FIGURE 12, along a line passing through the seals 226, 227. The flow of wet fluid influent is controlled in the wet part and the flow of dry fluid effluent is controlled in the dry fluid part.

Figure 1:
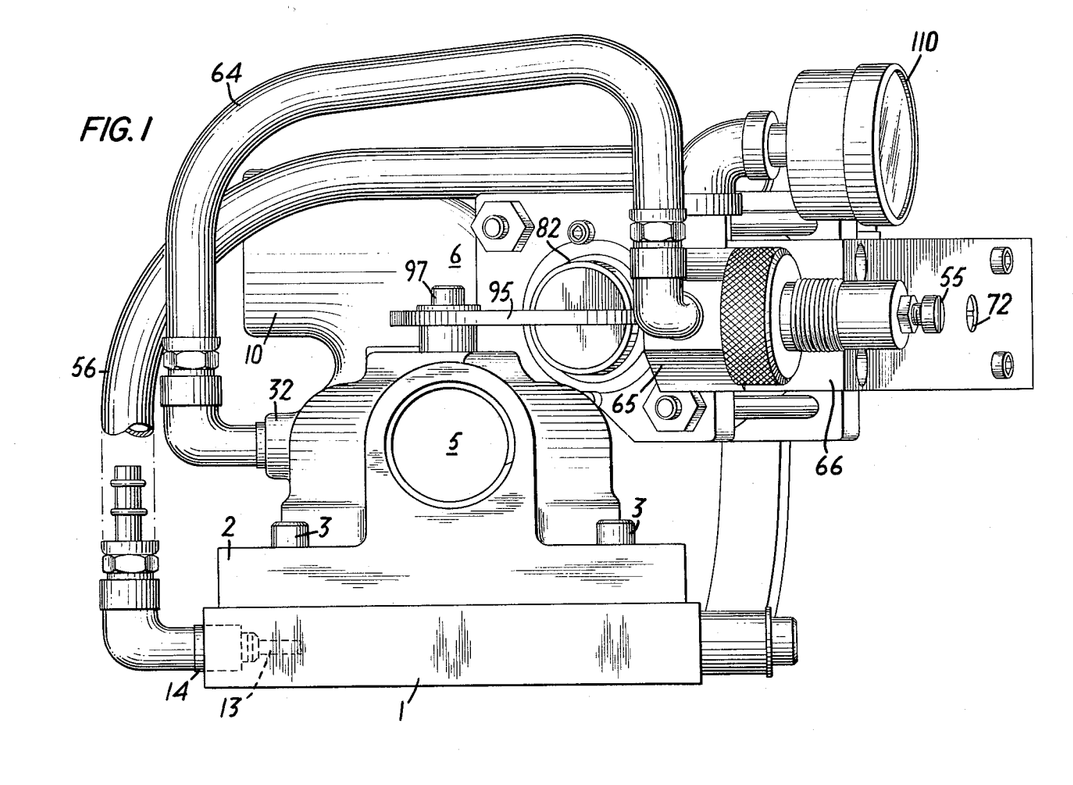
FIGURE 1 is an end view in perspective of a gas-timed pneumatic valve in accordance with the invention.
Figure 2:
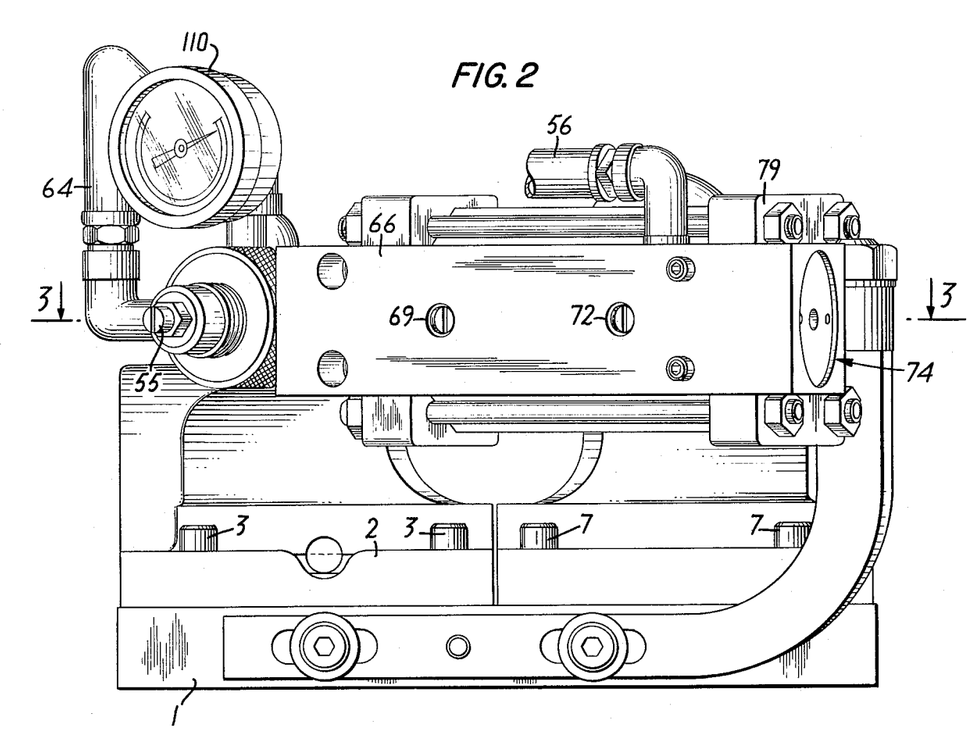
FIGURE 2 is a side view in perspective of the pneumatic valve of FIGURE 1.
Figures 3, 10:
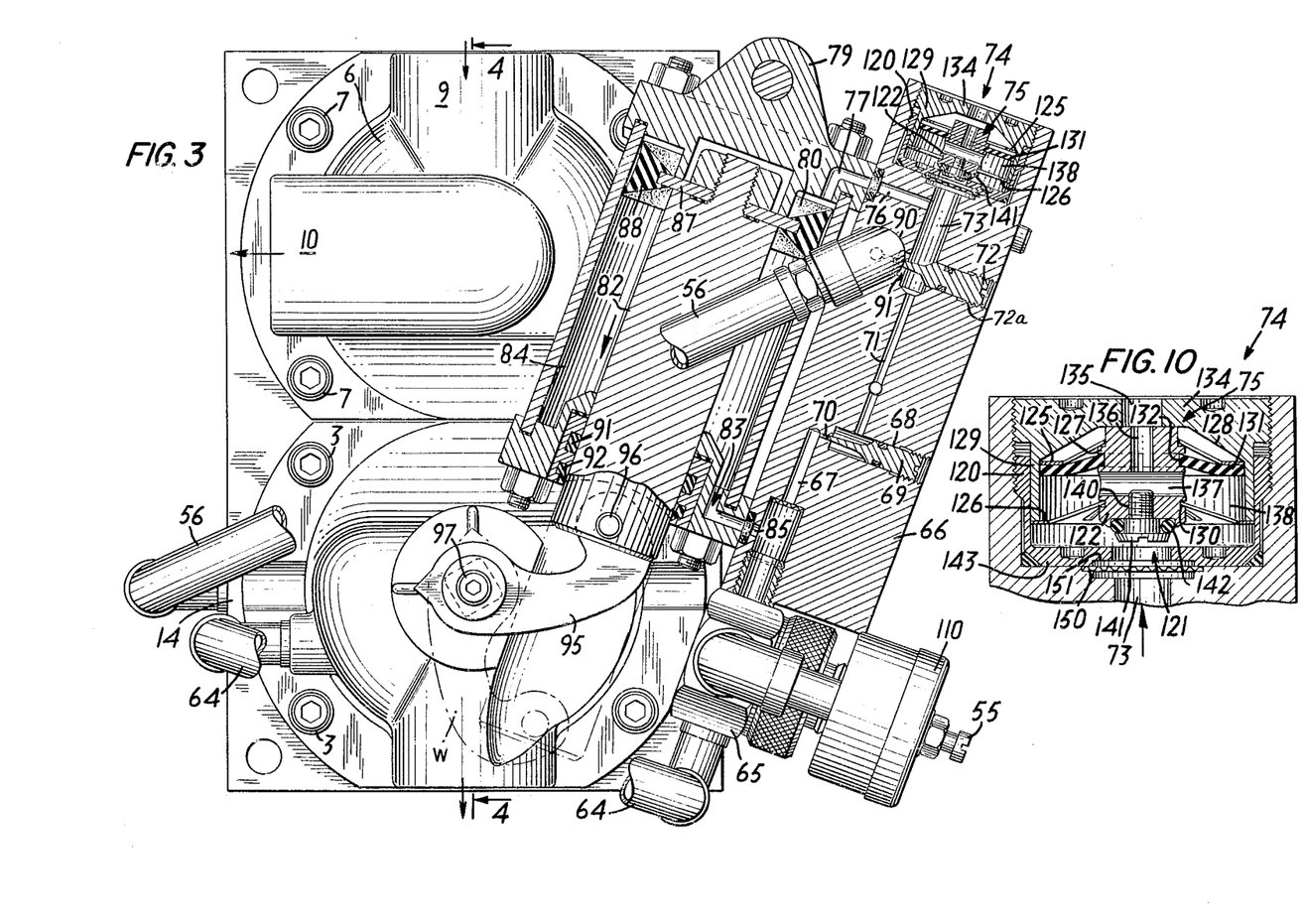
FIGURE 3 is a sectional view along the line 3—3 of FIGURE 2, and looking in the direction of the arrows, showing the gas-timing assembly.
FIGURE 10 is an enlarged view in cross section of the exhaust valve 74 of FIGURE 3.
Figure 4:
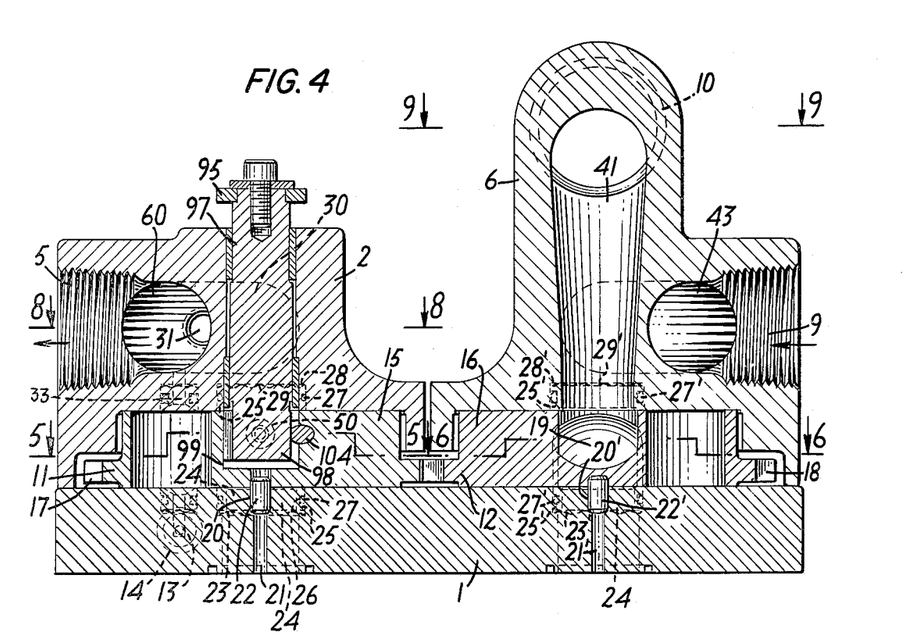
FIGURE 4 is a sectional view along the lines 4—4 of FIGURE 3, and looking in the direction of the arrows, showing the shear plate assembly and valve mounting plate.
Figure 5:
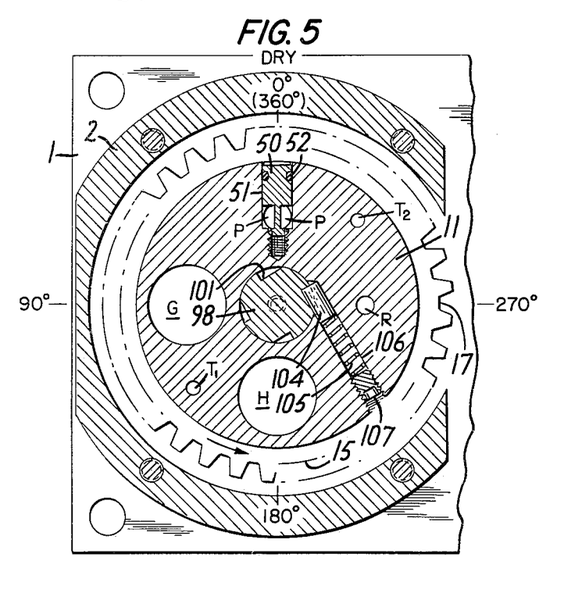
FIGURE 5 is a sectional view along the lines 5—5 of FIGURE 4, and looking in the direction of the arrows, showing the shear plate on the dry side of the valve.
Figure 6:
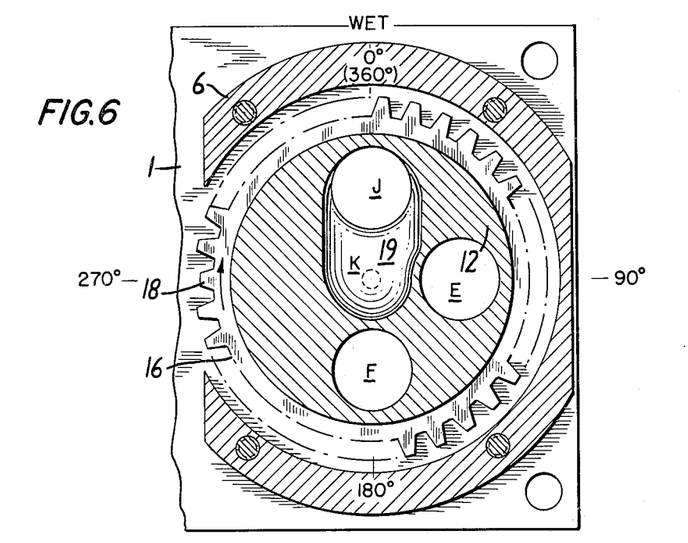
FIGURE 6 is a sectional view along the lines 6—6 of FIGURE 4, and looking in the direction of the arrows, showing the shear plate on the wet side of the valve.
Figure 7:
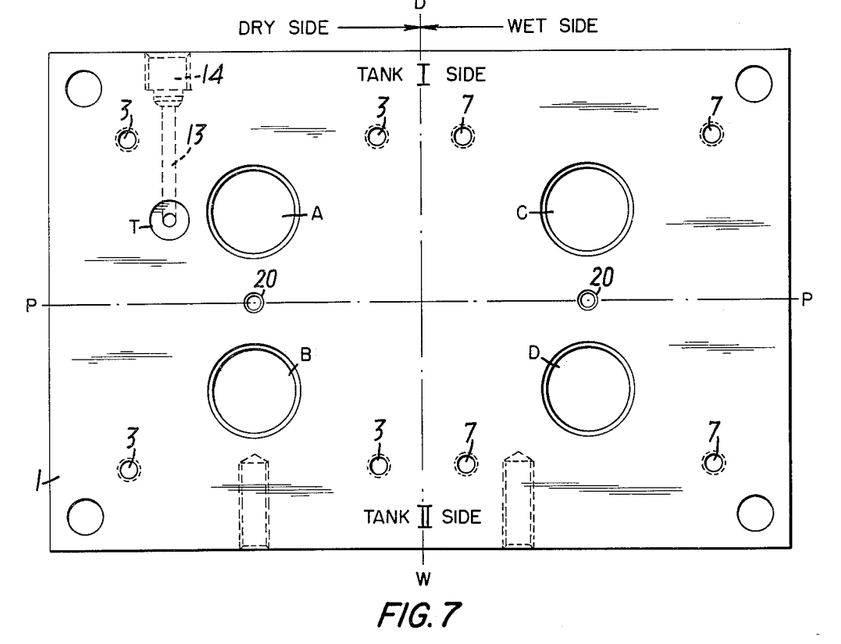
FIGURE 7 is a view of the top of the valve mounting plate, showing the arrangement of the ported passages which match the ported passages of the dry and wet shear plates.

The pneumatic gas valve of FIGURES 1 to 7 is supported on mounting plate 1, best seen in FIGURES 1, 4 and 7, suitably ported and provided with passages for distribution of the wet influent and dry effluent gases circulated through the system. The dry gas head 2 is secured to the mounting plate 1 by cap screws 3. The outer side of the dry gas head has an outlet port 5 for delivery of dry gas effluent from either of the two tanks with which the valve is connected, and is provided with suitable connecting passages for this purpose. The dry gas head 2 takes up approximately one-half of the surface area of the mounting plate. The other half is taken up with the wet gas head 6, secured to the plate 1 by cap screws 7. The side of the wet gas head 6 has an inlet port 9 for reception of wet gas influent and suitable connecting passages to distribute this to either of the two tanks. The wet gas head also has a port 10 and suitable connecting passages to vent purge flow from the tank on the desorption cycle to the atmosphere.

The lower portions of the dry gas and wet gas heads 2 and 6, respectively, facing the plate 1 are provided with cylindrical recesses (best seen in FIGURE 4) and in these recesses are disposed the dry and wet shear plates, 11 and 12, respectively. The shear plates are rotatably mounted between the heads 2 and 6 and the plate 1.

The structural details of the plate 1, shear plates 11 and 12, and the dry gas head 2 and wet gas head 6 will now be discussed.

The plate 1, as best seen in FIGURES 4 and 7, is provided with four ported passages, A, B, C, and D extending straight through from surface to surface of the plate. The tank connections (not shown) made with the plate connect ported passages A and C with tank I and ported passages B and D with tank II. Both of passages A and B are beneath the dry gas head 2, and passages C and D are both beneath the wet gas head 6. If a single partitioned vessel is used, the valve is so connected beneath the vessel that passages A and C are beneath tank I, and passages B and D beneath tank II. The plate 1 has an additional ported passage 13 extending from a port T adjacent passage A downwardly and laterally to a side port 14 on the plate.

The shear plate 11 is mounted on plate 1 above passages A and B in the plate, and is provided with several ported passages, all extending straight through the plate. Two large ported passages G and H are the same size as A and B, and these and two smaller ported purge passages, the purge passage P and the repressurization passage R, at predetermined positions of the shear plate line up with passages A and B of the plate 1. There are in addition two small ported passages T1 and T2, to one side of G, H, P and R, and these at predetermined positions of the plate 11 line up with port T of the plate 1.

The periphery 15 of the shear plate 11 is geared, and is in operating relation with a corresponding geared periphery 16 of shear plate 12. Shear plate 11 has one bastard recess 17 matching a corresponding bastard tooth 18 on the periphery of the shear plate 12, so as to ensure correct positioning of the shear plates on the plate 1, for proper alignment with the passages in the plate 1.

The shear plate 12 is provided with two large ported passages E and F extending straight through the plate, and at predetermined positions of the plate 12 these line up with passages C and D in plate 1. There is also one ported passage 19 extending in an S-shape from port K, at the center of the top surface of the plate 12, to port J at one side of the bottom surface of the plate, where it is aligned at predetermined positions thereof with passages C and D of the plate 1.

Each of the shear plates 11 and 12 is mounted on the plate 1 between the dry or wet gas heads, respectively, and since the mounting of each shear plate is similar, only the mounting of plate 11 will be described. A cylindrical recess 20 is provided in the plate 1, and at the base of the recess is a passage 21 which leads to the surface of the plate 1. This passage can be used for entry of oil to the shear plate axle pin 22. The axle pin 22 rests rotatably on a bearing seat at the entrance to the passage 21. Centered in the bottom of the two recesses 28 counterbored in ported passages A and B of the plate 1 are respective annular wave springs 23, which engage the lower surfaces of the seal inserts 24, and the sealing rings 25 which surround the insert. The sealing rings 25 have a peripheral groove 26 receiving an O-ring 27, ensuring gas-tight sealing of the inserts 24, and preventing gas leakage between the plate 11 and plate 1, at least while the plate 11 is stationary. The wave springs 23 hold the inserts 24 and rings 25 firmly against the lower face of plate 11, taking up any wear. The plate shears cross the rings and inserts when rotating on pin 22. Similar recesses 28 are counterbored in ported passages C and D below plate 12, and these similarly are provided with wave springs, inserts and rings.

Through the dry gas head 2 extends the shaft 97, which rotates the shear plate 11, as will later be described, and behind the shaft in recesses 28' counterbored in ports L and M in the lower face of the head 2 are annular wave springs 29, rings 25, and O-rings 27, to ensure proper sealing. The recesses 28 of the wet gas head 6 also have annular wave springs 29, rings 25 and O-rings 27. The passage 41 runs to the center of plate 12 to meet "S" curved passage 19. The spring 29 presses the ring 25 against the plate 11. It is apparent from this construction that as the shear plates rotate they shear against rings 25, which remain stationary, with the O-ring seal 27 providing a leak proof seal with the walls of the recesses. There may be gas leakage during rotation of the plate, but this is no problem, since rotation between successive plate positions takes only a second or two, at most.

Figure 8:
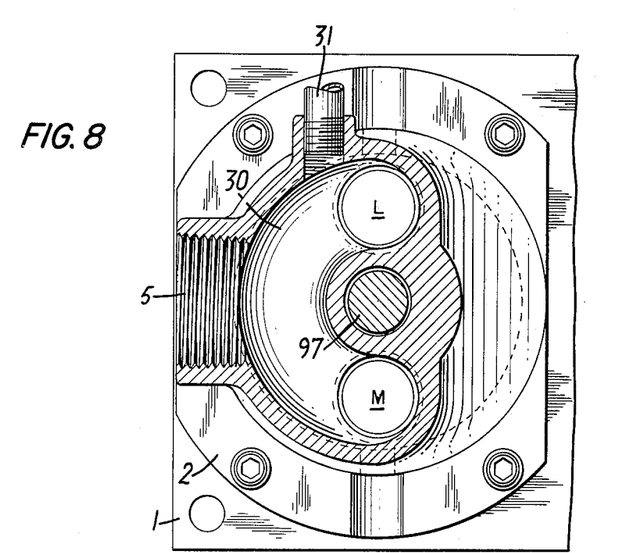
FIGURE 8 is a cross-sectional view of the dry gas head of FIGURE 4, taken along the lines 8—8 and looking in the direction of the arrows.

Within the dry gas head 2 there is a semi-toroidal passage 30, which can be seen in FIGURE 8 and which extends from each side of port 5 to ports L and M in the lower face of the head 2. The ports L and M are each in a position to line up with passages G, H, P and R of the plate 11, and port L is opposite passage A and port M is opposite passage B of the plate 1. Thus, the shear plate 11 at proper positions connects L and/or M and/or P and/or R with ports A and/or B in the plate 1, and tanks I and II are thus connected to the toroidal passage 30 in every position of the shear plate 11.

Opening into the side of toroidal chamber 30 near port 5 is a smaller passage 31 which extends laterally to port 32 in the side of the head 2. A pipe connection 64 connects port 32 to the timing circuit. Another passage 33 in the head 2 on the bottom of the toroidal chamber 30 adjacent port 5, and extends thence straight to a port T' on the bottom surface of the dry gas head, directly opposite port T in the plate 1. Thus, the shear plate 11 at proper positions connects passage 13 and port T of plate 1 with port T' and passage 33 of the head 2, via passages T1 and T2 in the shear plate 11.

It will be seen that a line runs from port 14 in the plate 1 to the timing circuit. Thus, passages 33, T1 and T2, and T13 constitute an additional line for gas flow to the timing circuit, supplementing passage 31, and in fact increase the rate of flow and shorten the time of the cycle, whenever T1 and T2 are in alignment with T and T'. The timing circuit is best seen in FIGURE 3, and will be described in detail later.

Figure 9:
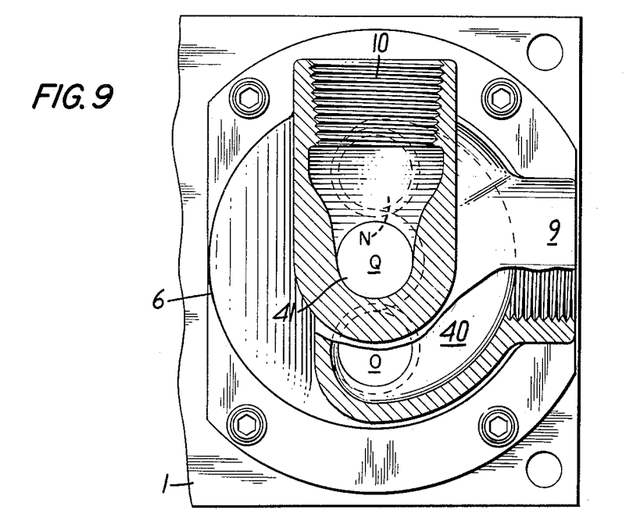
FIGURE 9 is a top view, partly in section, of the wet gas head of FIGURE 4, taken along the lines 9—9 and looking in the direction of the arrows.

The wet gas head 6, as is best seen in FIGURE 9, is provided with a semi-toroidal chamber 40. Chamber 40 extends from each side of port 9 to ports N and O on the lower face of the wet gas head, directly opposite passages C and D, respectively, in plate 1. Another passage 41 extends laterally from port 10 to the longitudinal axis of the head, and thence runs straight down to port Q on the lower face of hte wet gas head. Port Q and passage 41 are concentric to the axle pin 22, on which the shear plate is rotatably mounted.

Ports N and O are positioned to align with passages F, E and J, successively, according to the position of the shear plate 12, and whenever N is connected with passage C, tank I is connected to the wet gas inlet 9, and when O is connected with D, tank II is connected with the wet gas inlet 9. Whenever the shear plate 12 is positioned so that port J is opposite passage C or D of the plate 1, the purge passage 41 and purge port 10 are connected to tank I or tank II, respectively, for venting of purge flow from that tank, and while so connected the wet gas influent is cycled via passage D or C, respectively, to the other tank.

The positioning of the shear plates 11 and 12 so as to successively carry out a complete drying cycle, that is, an adsorption and then a desorption cycle in each tank or portion of the dryer, can now be understood. A complete drying cycle is completed for each 360° rotation of the shear plates.

At the start of the drying cycle, let it be assumed that shear plate 11 is in the 0° position shown in FIGURE 5, and shear plate 12 in the 0° position shown in FIGURE 6. In this position, on the wet side of the dryer, passage C of the plate 1 is in alignment with port J of the shear plate 12, and thus is connected with the purge port 10 via passage 19, port K, and then port Q and passage 41 of the wet gas head 6. Passage F in the shear plate 12 is in alignment with passage D on the base plate, and thus is connected via port O and toroidal chamber 40 of the wet gas head with the influent gas port 9. Hence, influent gas is directed to tank II, while tank I is connected to purge port 10.

On the dry side of the dryer, port H on the shear plate 11 is in alignment with passage B of the plate 1, thus connecting the dry gas effluent port 5 via toroidal passage 30 and port M with passage B. Purge passage P is aligned with passage A of plate 1, and thus A is also connected to the toroidal passage 30 via port L. Hence, dry gas effluent from tank II, which is on the adsorption cycle, is delivered to port 5, and a portion of this effluent is bled off via port L and passages P and A to tank I, which is on the desorption cycle, being regenerated.

Control of the proportion of the dry gas effluent that is drawn off from the semi-toroidal chamber 30 through the port L is made possible by the purge screw 50 in port P, best seen in FIGURE 5. The purge screw is threadably mounted in socket 51, and moves across and closes off a portion of the port P, according to its adjustment in the socket. The O-ring seal 52 on the screw ensures a gas-tight seal of the screw in the socket 51.

When adsorption and desorption are complete, in about four minutes forty seconds, it is necessary to change over the flow between tanks I and II, so as to put tank II, which is now completely spent, on the desorption or regeneration cycle, and tank I, which is now fully regenerated, on the adsorption or drying cycle. Inasmuch as the desorption cycle is carried out at a lower pressure than the adsorption, it is necessary first to repressurize tank I. This is accomplished in the next position of the shear plates 11 and 12, and to reach this position shear plate 11 is rotated through an arc of 90°, counterclockwise, and shear plate 12 is rotated thereby 90° clockwise.

In this 90° position of shear plate 12, passage D in the plate 1 is in alignment with passage E of the shear plate and port O of the wet gas head 6, ensuring a continued flow of wet gas effluent from port 9 to tank II. Passage C in the plate 1 is not in alignment with any passage in the shear plate, and is accordingly closed off. Thus, at this position of plate 12, the exit passage from tank I is closed.

In this 90° position of shear plate 11, passage B of the plate 1 is in alignment with port G of the shear plate, ensuring a continuance of flow of dry gas from tank II through the semi-toroidal chamber 30 to port 5. At the same time, repressurization passage R is in alignment with passage A of the plate 1, ensuring a continuance of gas flow to tank I from the semi-toroidal chamber 30. Since tank I is still connected via passage R with the effluent port 5, while the exit passage is closed at shear plate 12, the pressure in tank I is built up, until it is equal with the pressure in tank II.

Fast timing passage T1 in the plate is also in alignment with the timing ports and passages T'–33 and T–13, so as to give a more rapid flow of gas to the timer block, and ensure a fast stroke of the piston, and so a short period for the repressurization cycle, a time not exceeding about 20 seconds in most cases.

When repressurization is complete, the shear plate 11 and 12 are each rotated an additional 90°, so that they have now reached the 180° position from the starting point.

With the shear plate 12 in this 180° position, passage F in the shear plate is in alignment with passage C in the plate 1, as a result of which the wet gas effluent from the inlet port 9 now enters tank I, which is on the adsorption cycle, passage J of the shear plate, which connects via port K with the purge port 10, is in alignment with passage D of the plate 1, and thus tank II is connected with the purge port 10.

Shear plate 11 in the 180° position has passage H connecting with passage A of the plate 1, permitting dry gas effluent to flow from tank I to the outlet port 5. At the same time, passage P is aligned with port M and the semi-toroidal chamber 30, connecting with passage B to tank II, so that dry gas effluent purge flow passes into tank II. Neither of the T1 or T2 passages of the shear plate, are in alignment with the fast timing passages, and thus the fast timing circuit is not supplied with dry gas effluent in this cycle, which consequently is a long cycle, of the order of four minutes forty seconds.

Finally, at the conclusion of the adsorption and desorption cycle, for tanks I and II, respectively, the shear plates are rotated further 90°, so that they are now 270° from the starting point. At this point, passage E of shear plate 12 is in alignment with the passage C of plate 1, so that wet gas effluent continues to flow to tank I from port 9, while passage D is not aligned with any passage in the shear plate, so that the purge flow entering tank II can no longer escape, and pressure is built up, preparatory to putting tank II on the adsorption cycle. At the same time passage G of shear plate 11 is in alignment with passage A of plate 1, continuing to supply dry gas effluent to the semi-toroidal passage 30 and the gas outlet 5, and repressurization passage R is in alignment with the passage B of plate 1, continuing the flow of dry gas effluent to tank II to repressurize it. Passage T2 is in alignment with ports T and T' and passages 13 and 33, so as to supply gas to the fast timing circuit for a fast repressurization cycle, of the order of 20 seconds.

Finally, at the conclusion of this repressurization cycle, the shear plates 11 and 12 are rotated a further 90°, returning them to their 0° starting point, and the entire 360° drying cycle can now be repeated.

The timing circuit of the valve of the invention is of a particularly efficient type, utilizing the dry gas effluent flow to time the adsorption and desorption cycles as well as the repressurization before the adsorption cycle. The construction of the circuit is best seen in FIGURE 3. The supply of dry gas flow to the timer is continuous in every position of the shear plates 11 and 12, and is furnished by way of passage 31, opening from one side of the semi-toroidal chamber 30, and running to port 32 on the surface of the head, and thence by a pipe connection 64 to port 65 in the timing block 66. A small passage 67 in the timing block leads from port 65 to a throttle valve chamber 68. Gas flow into the chamber is controlled by the position of the throttle valve 69, which is threaded into the chamber 68 and reduces the opening of the valve seat 70 to an annulus. The size of the chamber annulus is readily adjusted by screwing the valve in or out of the chamber 68, and thus the volume of gas flow beyond this point is easily controlled to any fine adjustment required.

A second passage 71 in the timing block extends from the throttle valve chamber 68 to a second throttle valve chamber 72, where it joins a larger passage 73, and terminated in a port 74, which is closed off by an exhaust valve 75, the structural details of which will be described later.

Opening into passage 73 at a point near the port 74 is another passage 76, which extends through the block 66 to connect with a corresponding passage 77 in the cylinder block 79. Passage 77 leads to the far end 80 of a cylinder chamber, on one side of a piston rod 82. A second passage 83 in the cylinder block 79 leads from the near end 84 in the timing block. Passage 85 opens into passage 67 before the throttle valve 69.

The piston rod 82 is provided with a piston 87, the outer periphery of which bears a neoprene sealing ring 88, which makes a gas-tight seal against the wall of the cylinder chamber.

The piston 87 is reciprocated in the cylinder chamber by application of gas pressure to one or the other side of the piston 87. The piston rod is sealed against leakage during such reciprocation by the neoprene O-ring 91 and wiper ring 92.

Reciprocating movement of the piston 87 from the far end to the near of the cylinder, in the direction shown by the arrow, actuates a lever arm 95, moving it ultimately to the limiting position shown in dotted lines and marked W. The lever arm 95 is pivotally mounted on the piston rod 82 at 96, and is fixedly mounted on the end of shaft 97. The other end of shaft 97 terminates in a portion 98 which is rotatably fitted in a cylindrical socket 99 in the shear plate 11. The portion 98 has a serrated edge 101, which is operatively connected to a ratchet pin 104. The number of serrations correspond to the number of operative positions of the shear plate 11, in this case, four, evenly spaced and 90° apart.

The ratchet pin 104 is mounted on a compression spring 105, in a socket 106 in the shear plate 11. The compressibility of the spring 105 can be adjusted by the set screw 107.

As is now apparent, with one complete reciprocation of the piston 87 from the far end to the near end of the cylinder chamber, the shaft 97 is rotated 90° by lever 95, and with it the serrated edge 101 at the end of the shaft is also rotated 90°. The serrations face the ratchet pin, so that rotation of the shaft 97 in a clockwise direction does not result in movement of the shear plate, but merely presses the ratchet pin 104 into socket 106 against the spring 105, the shaft 97 meanwhile slipping in socket 99 in the plate 11. After the ratchet pin has been forced completely into the socket 106, the shaft 97 and insert 101 continue to move in a clockwise direction, for the remainder of the 90° arc to the next serration, whereupon the pin is free to leave the socket and is therefore urged by the spring into position to lock the shaft against counterclockwise slipping in its socket 99 in the plate. At this point, the piston 87 has reached the end of its stroke, and now returns to the far end of the cylinder chamber, whereupon the shaft 97 is rotated counterclockwise 90° by lever arm 95. Now the shear plate 11 is locked on the shaft 97, by the ratchet pin 104, and thus the shear plate is also rotated 90° counterclockwise by the shaft to the next position of the valve.

It is thus apparent that the shear plate 11 is rotated 90° in a counterclockwise direction with each reciprocating movement of the piston from the near end to the far end of the cylinder. Rotation of the shear plate 11 counterclockwise carries with its a corresponding clockwise rotation of the shear plate 12, with which it is operatively connected by the geared peripheries.

Reciprocation of the piston 87 is ensured by the application of gas pressure via the timing circuit. The rate of build up of pressure to that needed to move the piston controls the rate of movement of the piston, and hence the time of the cycle. Movement of the piston 87 from the near to the far end of the cylinder (90° counterclockwise rotation of shaft 97 and shear plate 11, to position shear plate at end of cycle) is obtained by buildup of gas pressure in the near end 84 of the cylinder chamber by admission of gas from passages 67, 85 and 83. Since passage 67 is connected directly with the semi-toroidal passage 30 without interposition of valves, and the size of these passages is relatively large, such buildup of pressure and consequent movement of the piston is rapid, and requires only a few seconds. Gas in the far end 80 of the chamber is vented, simultaneously, via passage 76, and exhaust valve 75.

Movement of the piston 87 from the far to the near end of the cylinder chamber (clockwise rotation of shaft 97, no rotation of shear plate 11, long cycle time) is obtained by buildup of gas pressure in the far end 80 of the chamber by admission of gas from the effluent line via port 32, line 64 and passages 67, 71, 73 and 76. The time required for the pressure to build up to move the piston 87 all the way to the near end of the chamber is controlled by the adjustment of the throttle valve 69. Thus, any length of cycle can be obtained, as required. In the device shown, the long cycle time is set at four minutes and forty seconds, which is sufficient in one adsorption cycle or one desorption cycle to completely exhaust or regenerate the beds. As the piston moves, gas in the near end 84 of the chamber is vented via passages 83, 85, and 67. During the fast cycle operation described below, gas is vented via passages 83, 85, and 67, and gas pressure regulator 55.

During repressurization of the tanks, preparatory to changing a tank from the desorption to the adsorption cycle, a short cycle time is required, and hence a rapid build-up of the pressure in the far side 80 of the cylinder chamber is desired. For this purpose, a by-pass line is provided which ensures a more rapid supply of gas to the far side of the piston at such times. This is the fast timing circuit.

The line enters the timer block at port 53, connected by a passage 54 to the valve seat end of throttle valve chamber 72a, entry into which is reduced to an annulus by throttle valve 72, threadably inserted in chamber 72a. The position of the valve in the valve seat controls the flow of gas into passage 73, supplementing the flow from passage 71. A pipe connection 56 extends from the port 53 to port 14, passage 13 and port T of the plate 1, thus providing a connection directly from the semi-toroidal chamber 30 via passage 33 to port T on the lower face of the dry gas head 2. The port T' and passage 33 of the dry gas head 2, and port T and passage 13 in the plate 1, are operatively connected only when one of the ported passages T1 and T2 of the shear plate 11 is in alignment therewith. These ported passages are placed on the plate 11 so as to be in alignment only at the time repressurization of either tank I or tank II is desired.

The exhaust valve 75 is of a special construction to ensure against any gas leakage at the slow flow rates in the system, while at the same time opening at a relatively low pressure differential between passages 73 and 76 of the timing circuit and the atmosphere. In view of the slow rate of normal feed of gas into line 73, on the long time cycle even a slow leak could greatly lengthen the time of the cycle. This is less of a problem when gas flow is also provided via line 33-13-56-54, but of course prevention of leakage is desirable in all cases. Whenever the crack open pressure in passages 73 and 76 is reached, the valve opens quickly and fully to the maximum opening, and then the pressure is reduced to atmospheric almost immediately, so that the piston 87 is rapidly returned to the far end 80 of the cylinder. This assures rapid rotation of the shear plates 11 and 12 to their next position.

The exhaust valve 75 comprises an exteriorly threaded casing 120 inserted in the internally threaded port 74, and open at the outer end. The inner end of the casing is partially closed by a wall 143 having a central orifice 121 communicating with passage 73 of the timing block. A poppet 122 is reciprocatingly mounted in the casing by a pair of Belleville spring discs 125 and 126. Both discs have a deeply serrated central orifice, permitting flow of gas through the discs. Disc 125 is seated on a ledge 127 of the poppet, and held in position there by the reentrant portion 128 of an externally threaded insert 129 which is screwed in the remaining threaded portion in the port into the open end of the casing. Disc 126 is seated within a groove 130 of the poppet, and retained within the casing 120 by the inner end of insert 129. A piston ring 131 of buna N synthetic rubber is retained in a groove 132 in the poppet, and forms a leakproof seal with the side wall of the insert 129.

The insert 129 has a top wall 134 with a central orifice 135 directly opposite and coaxial with a passage 136 in the poppet. The top wall 134 of the insert acts as a stop, to prevent the poppet 122 from escaping from the space within the casing 120 and insert 129 upon opening of the exhaust valve. The passage 136 of the poppet is of a diameter selected to control the rate of dump of gas through the valve. Passage 136 terminates in a T with transverse passage 137 of the poppet, and passage 137 opens into the open space 138 within the insert 129 and casing 120 on the inner side of piston ring 131.

The inner end of the poppet has a threaded socket 140 with a flanged screw 141 defining a groove of variable width between its flange and the end of the poppet. In this groove is placed an O-ring 142 of resilient material such as neoprene, and the O-ring is held against the poppet by appropriate adjustment of screw 141 to form a leakproof seal therewith, and compress the O-ring to the desired degree. The O-ring seats against the bottom wall 143 of the casing 120 at the orifice 121, and closes off the orifice when in the position shown in FIGURE 3. The open position of the poppet is shown in FIGURE 10.

The insert 129 is so positioned in the casing 120 as to stress the Belleville spring discs 125 and 126 to hold the poppet 122 and O-ring 142 firmly against the bottom wall 143 of the casing, to form a gas-tight seal at the orifice 126. Since the insert 129 is threadably held in casing 120, it can be placed in any desired position to put whatever stress is required upon the Belleville springs. The springs 125 and 126 and the stress are so selected that the springs deflect at the predetermined pressure differential for venting the timing circuit, thus moving poppet 122 away from orifice 121 and opening the exhaust valve 75. Normally, to prevent loss of the required setting, the insert 129 is fixed to the casing 120 by bonding, after the position required therein has been determined.

It is preferred to stress the Belleville spring discs so as to correspond to a point in their actuating force-deflection curve on the positive rate side and just before the change in slope to a negative rate is reached. In this way, a pressure differential of the order of 40 to 45 p.s.i.g. or above, will move the poppet 122 slightly away from the orifice, whereupon the spring discs snap through and open the exhaust valve. The wall 134 of the insert 129 serving as a stop for the poppet 122 is so placed that at the furthest limit of reciprocation of the poppet, when it has reached the wall, the Belleville springs 125 and 126 are still stressed in the negative rate portion of their curve, before the deflection of the disc has passed through zero, so that the spring discs automatically return to their normal position whenever the pressure in the system returns to normal, i.e., atmospheric or slightly above, up to about 7 p.s.i.g.

The Belleville spring discs of the invention are bowed against the application of pressure and open fully at a predetermined pressure differential. The flow-through required is provided by so dimensioning the serrations at the inner orifice as to give an annular opening of a sufficient flow capacity when the valve cracks open. Disc thickness, amount of bow, disc diameter and annular opening diameter are determined by the pressure differential to be resisted, i.e., the resistance to be offered by the spring action of the disc, and the flow capacity needed at a given pressure differential. Control of the rate of dump is obtained not by dimensioning of the disc but by dimensioning of the passage 136 of the poppet.

The spring disc of the invention is made of material of high yield strength and high hardness. Materials having minimum yield strengths of 30,000 to 250,000 p.s.i. can be used, with a Rockwell hardness of the order of C-45. Steel, stainless steel, and nickel chromium alloys are satisfactory, as also are certain synthetic resins such as polytetrafluoroethylene and polyoxymethylene. Such resins can also be used to coat the discs made of metal. Spring discs of the desired type are available, and are sometimes called Belleville washers.

The disc can be uniform in thickness throughout or can vary in thickness, thinner at the center than at the edge, to give improved flexing and sealing.

Fluid flow conditions of all kinds can be met by appropriate design of the spring disc to any load-deflection characteristics required in the system. The geometry of these discs is established by the disc's outside diameter and inside diameter, its free height measured from the inside edge (along the perpendicular to the outside edge) and its thickness. Proper selection of the geometry, using mathematical tables and equations of Fortini, Machine Design, September 4, 1958, "Conical-Disc Springs" will give a valve capable of pressure-relieving response to any type of load in any desired way.

Any type of exhaust valve can of course be used in place of the Belleville spring exhaust valve 75, such as a conventional poppet and spring type valve. However, the exhaust valve of the invention is preferred because it provides zero leakage up to the crack open pressure and a rapid response to maximum opening.

In order to protect the passages of the timing device and the remainder of the apparatus from the entry of dirt and other foreign material from the atmosphere when the exhaust valve 75 is open, a filter element 150 is provided at the base of the port 74, at the point where the port joins the passage 73. The filter is held there by the casing 120, which has a recess 151 directly above the filter element, to provide collection space for material removed by the filter. The filter shown is made of a sintered wire mesh, as described in U.S. Patents Nos. 2,925,650 and 3,049,796.

The operating and the timing mechanism of the valve to rotate shear plates 11 and 12 to their various successive positions can now be understood from the above description.

When the shear plate 11 is in the 0° position, as shown in FIGURE 5, none of the timing ports T1, T2 is in alignment with the fast timing passages 33–13 in the dry gas head 2 and plate 1, respectively. Dry gas effluent is supplied to the timing block via the normal line of passage 32, line 64, port 65, passage 67, throttle valve 69 and passages 71, 73 and 76, to the far side 80 of the piston 87. The rate of flow is low, due to the throttle valve 69, which is adjusted for a four minute forty second cycle. As the pressure in the chamber 80 increases, the piston 87 gradually is driven towards the near end 84 of the chamber. In the course of its movement, piston rod 82 pushes lever arm 95, which results in a corresponding clockwise rotation of shaft 97. The ratchet pin 104 is accordingly forced into its socket 106 against the spring 105. When the piston 87 has reached the near end 84 of the chamber, the lever arm 95 and the shaft 96 have rotated through a 90° arc, so the ratchet pin 104 is free and does emerge from its socket by the action of spring 105, into the next serration of the shaft end, and the piston stops.

The gas pressure in the far end 80 of the chamber continues to build up, however, since the piston can move no further, and quickly reaches the crack open pressure differential of the exhaust valve 75, which is set at only slightly above the piston operating pressure, for greater speed of reaction of the exhaust valve to the stopping of the piston. Thereupon the exhaust valve 75 opens, and dumps the gas to the atmosphere. Immediately, the pressure in chamber 80 and connecting passages is reduced to atmospheric. However, gas continues to be supplied to the near side 84 of the cylinder via passages 83 and 85 from the passage 67 in the timing block. Pressure builds up more rapidly on the near side 84 than on the far side 80, due to the throttling effect of valve 69, and the piston 87 is therefore urged towards the far end 80 of the cylinder.

The passages 83 and 85 are large enough to ensure a flow sufficient to thrust the piston a full stroke within a fraction of a second. Thus, the piston 87 is reciprocated, and with it lever arm 95, which now rotates shaft 97 in a counterclockwise direction. At the same time, because the ratchet pin 104 locks the shaft against rotation in its socket in shear plate 11, the shear plate 11 is rotated thereby counterclockwise through a 90° arc, and so the shear plate is carried to its next 90° position. At the same time, plate 12 is also rotated by plate 11 clockwise through a 90° arc to its next 90° position.

At this 90° position of the valve, the tank II is to be repressurized, so as to prepare it for the adsorption cycle. Port T1 of the shear plate 11 is in alignment with fast timing passages 33–13 in the dry gas head 2, and plate 1, respectively, and a flow of gas supplementing that still entering the timing block via port 65, and passages 67 and 71, is now provided by way of port 90 and passage 91 in the timing block, past the throttle valve 72. This is a greater flow than that of passage 71, and the resulting rapid flow of gas through passages 73 and 76 to the far end 80 of the cylinder chamber rapidly increases the pressure, and very quickly forces the piston 87 to the near end 84 of the chamber.

Immediately thereafter the pressure in this part of the timing block reaches the crack open pressure differential of the exhaust valve 75, dumping the gas and reducing the pressure to atmospheric. Thereupon, pressure on the near side 84 of the piston 87 builds up, the piston returns to the far end of the chamber, carrying with it the lever arm 95, and rotating the shaft 97 and the shear plate 11 through a 90° arc in a counterclockwise direction. The plate 11 again rotates plate 12 90° in a clockwise direction.

Both shear plates are now 180° from the starting point. tank I is accordingly put on the adsorption cycle, while tank II is put on the desorption cycle.

In this position of the shear plate 11, neither of ports T1 and T2 is in alignment with the fast timing passages 33–13, and thus only the normal flow of gas is provided to the timing block, slowly moving the piston 87 towards the near end of the chamber for the long adsorption and desorption cycle. When the piston 87 has reached the near end of the chamber, the crack open pressure differential of the exhaust valve 75 is reached, the valve opens, the gas is vented to the atmosphere and the pressure restored to atmospheric, and the piston 87 is returned to the far end of the chamber under the increased pressure on its near side 84. Once again, the shaft 97 is rotated 90° counterclockwise, and with it the shear plate 11, while shear plate 12 is rotated clockwise. The valve is now in a position 270° from the starting point.

The valve now repressurizes tank II, so as to prepare it for the adsorption cycle. Port T2 in the shear plate 11 is aligned with passages 33–13. Accordingly, repressurization is accomplished quickly, and within 20 seconds the piston 87 has reached the near end 84 of the chamber, whereupon the crack open pressure differential of the exhaust valve 75 is reached, the gas dumped, and the piston 87 quickly returns to the far side 80 of the chamber, in so doing rotating the shear plates 11 and 12 90°, and returning them to the original 0° position. The 360° drying cycle can then be repeated.

Figures 11, 15:
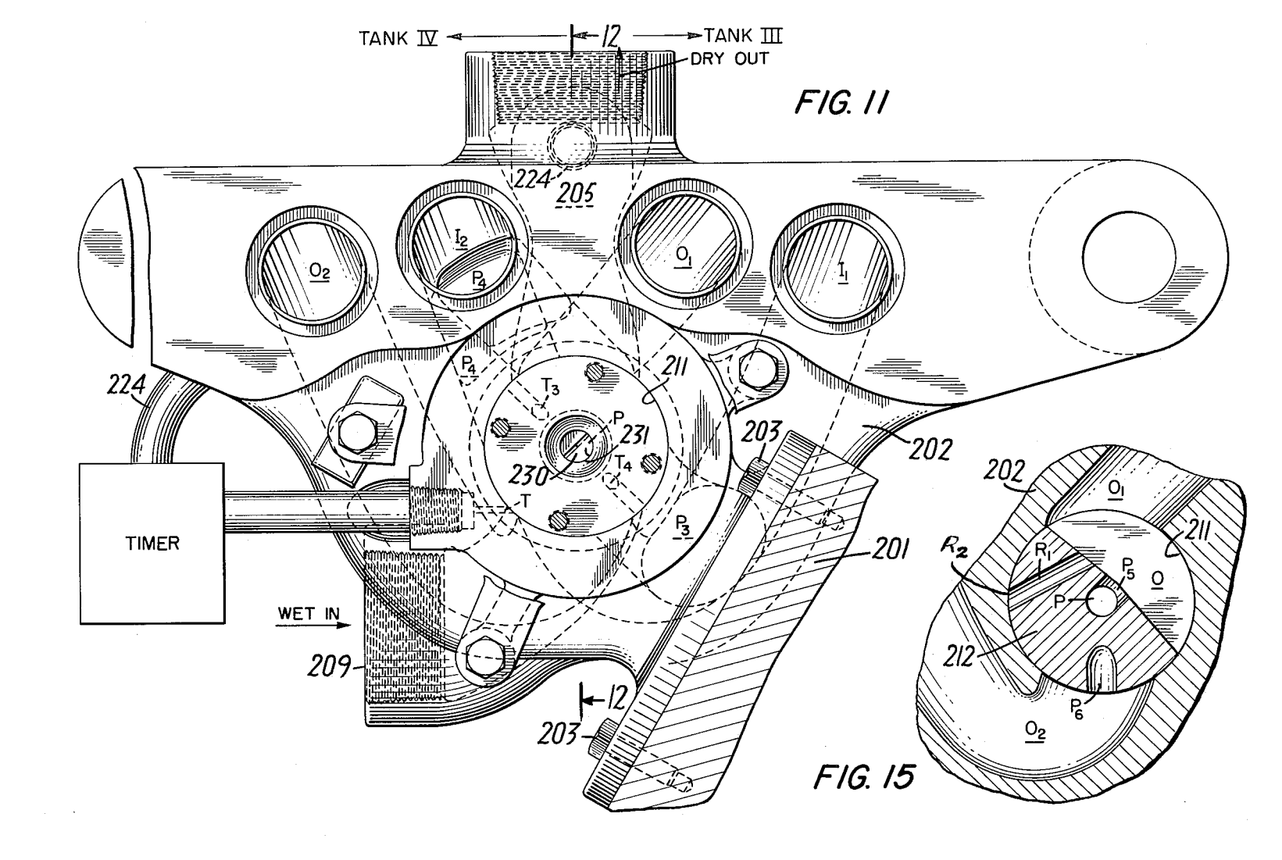
FIGURE 11 is a cross section through the base of the housing and rotor of another embodiment of valve, of the cylindrical rotor type.
FIGURE 15 is an enlarged cross sectional view of the valve of FIGURE 11 taken along the lines 15—15 of FIGURE 12, and looking in the direction of the arrows.

The pneumatic valve of FIGURES 11 to 14 is supported on mounting plate 201, best seen in FIGURE 11. The manifold 202, suitably ported and provided with four passages for distribution of the wet influent and dry effluent gases circulated through the system to the two tank sections of the dryer, is secured to the mounting plate 201 by cap screws 203. The central portion of the manifold is provided with an open-ended cylindrical recess 211 (best seen in FIGURE 12), and in this recess is disposed a cylindrical ported rotor 212. One side of the manifold 202 has an outlet port 205 for delivery of dry gas effluent from either of the two tanks with which the valve is connected, and is provided with suitable passages for this purpose. The other side of the manifold 202 has an inlet port 209 for reception of wet gas influent, and suitable passages to distribute this to either of the two tanks. There are also a passage 218 and a port 219 in the valve rotor 212 and suitable connecting passages in the manifold to vent purge flow from the tank on the desorption cycle to the atmosphere.

The structural details of the manifold 202 and rotor 212 will now be discussed.

The manifold 202 is mounted on plate 201 and is provided with ported passages $I_1$, $O_1$, $I_2$ and $O_2$, all extending straight through the manifold and leading to opposite sides of the valve central recess 211. The tank connections (not shown) made with the manifold connect ported passages $I_1$ and $O_1$ with tank III, and ported passages $I_2$ and $O_2$ with tank IV. If a single partitioned vessel is used, the valve is so connected beneath the vessel that both of passages $I_1$ and $O_1$ are beneath tank III, and passages $I_2$ and $O_2$ are both beneath tank IV. These four main ported passages are the same size, and from passages $I_1$ and $I_2$ two smaller ported purge passages, $P_3$ and $P_4$, lead to opposite sides of one end of the recess 211. There is also a small ported passage T leading from the other end of the recess 211 to connections to a timing device, such as that shown in FIGURES 1 to 10, and a ported passage 224 leading from effluent port 205 to the timing device.

The rotor 212 is provided with corresponding ported passages and cutbacks for connecting selected groups of the passages of the manifold opening into the recess 211 with each other, and with ports 205 and 209, and with the atmosphere. Radial cutbacks I and O connect $I_1$ and $I_2$, and $O_1$ or $O_2$, respectively (one at a time of each pair), wit hthe influent port 209 and effluent port 205. At one end, two small ported passages $T_3$ and $T_4$ at predetermined positions of the rotor 212 line up with passage T of the manifold 202. A cylindrical cutback TT reducing further the shaft of the rotor leads off radial cutback O and gives access from ports $O_1$ or $O_2$ to the timing passage $T_3$ or $T_4$. The passage P terminates at port $P_5$ at one side of the rotor. A side passage from P leads to port $P_6$ at the other side of the rotor, 180° from port $P_5$. $P_5$ and $P_6$ are aligned at predetermined positions of the rotor with passages $O_1$ and $O_2$ of the manifold. When in such alignment, dry effluent is directed from the outlet of one tank in counterflow to the outlet of the other tank. A repressurization passage $R_1$ and port $R_2$ leads across one side of the rotor, 90° between ports $P_5$ and $P_6$, and also becomes aligned with one of ported passages $O_1$ and $O_2$ at predetermined positions of the rotor. Finally, at the other end of rotor 212 is a central L-shaped purge port 219 and passage 218, connecting at predetermined positions of the rotor with purge ports $P_3$ and $P_4$, respectively, for venting purge flow to the atmosphere. Passage 218 is connected to $P_4$ whenever tank IV is on purge, and to $P_3$ whenever tank III is on purge.

At the base of the recess 211 is a passage 221 which leads to outside the manifold 202. This passage can be used for entry of oil to the rotor axle pin 222.

The recess 211 is provided with three circumferential grooves 225 spaced so as to separate the ports $P_3$, $P_4$; $I_1$, $I_2$; and $O_1$, $O_2$, and in these grooves are Teflon glide rings or bearings 226 and sealing O-rings 227, which encircle the glide rings, ensuring gas-tight sealing of the rotor, and preventing gas or liquid leakage between the rotor and manifold. The rotor shears across the glide rings 226 when rotating on pin 222.

The radial cutback O, which extends from each side of rotor 212 nearly 180° across the face of the rotor, is in a position to line up with passage $O_1$ or $O_2$ of the manifold, and port 205, and the radial cutback I lines up with $I_1$ or $I_2$ and port 209. Thus, the rotor 212 at proper positions connects $O_1$ or $O_2$ with 205, and $I_1$ or $I_2$ with 209, while $P_5$ and $P_6$ or R are connected to the other of $O_1$ or $O_2$, and $P_4$ or $P_3$ to the other of $I_1$ or $I_2$. Tanks III and IV are thus connected to deliver dry effluent at 205 in every position of the rotor 212. At the same time, the rotor at proper positions connects the radial cutback TT with either timing passage $T_3$ or $T_4$, and either $T_3$ or $T_4$ with port and passage T of the manifold, thus delivering via cutback TT and passages $T_3$ and $T_4$ dry effluent gas from $O_1$ or $O_2$ to passage T and the timing device.

It has been seen that a direct line 224 runs from port 205 in the manifold 202 to the timing circuit. Thus, cutback TT and passages $T_3$–T or $T_4$–T constitute an additional line for gas flow to the timing circuit, supplementing passage 224, and in fact increase the rate of flow and shorten the time of the cycle, whenever TT and $T_3$ or $T_4$ are in alignment with T. The timing circuit is best seen in FIGURE 3.

The positioning of the rotor 212 so as to successively carry out a complete drying cycle, that is, an adsorption and then a desorption cycle, in each tank or portion of the dryer, can now be understood. A complete drying cycle is completed for each 360° rotation of the rotor.

Figure 12:
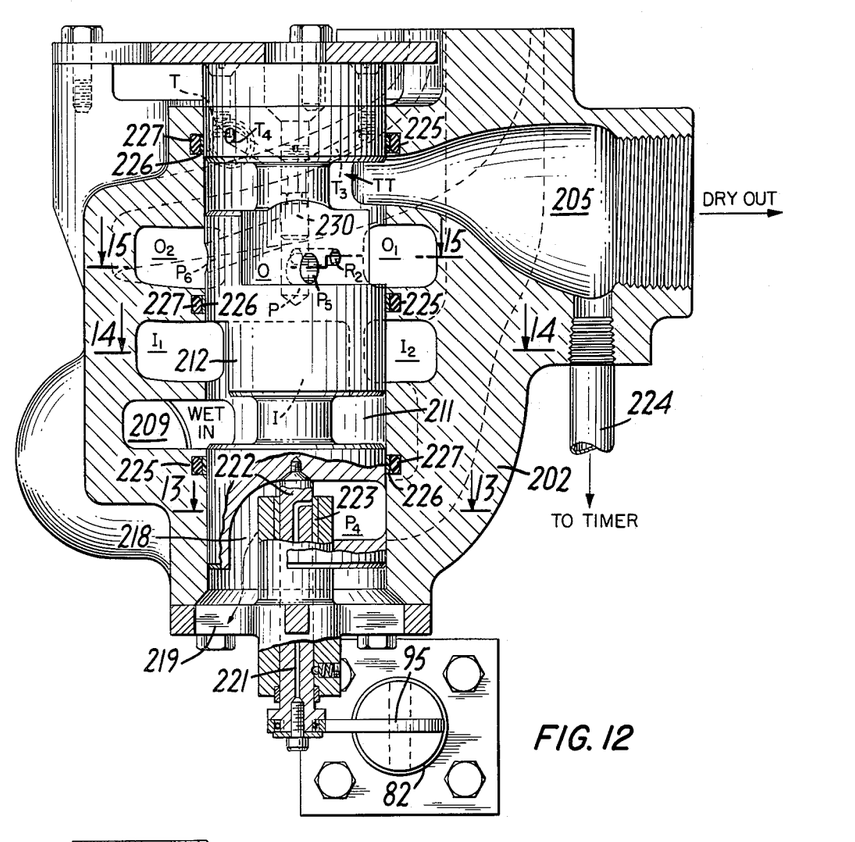
FIGURE 12 is a longitudinal section along the lines 12—12 of FIGURE 11, and looking in the direction of the arrows.
Figure 13:
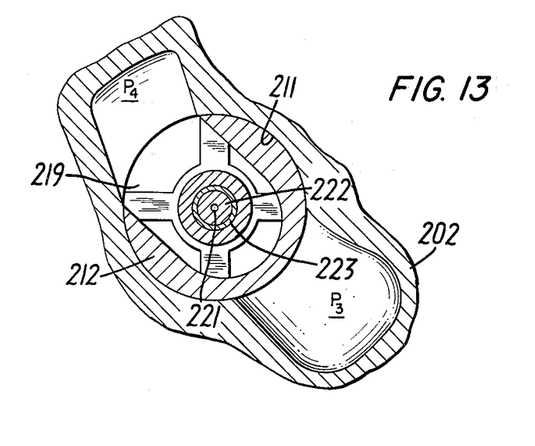
FIGURE 13 is an enlarged view of the purge ports and passage of the rotor of FIGURE 12, taken along the lines 13—13 and looking in the direction of the arrows.
Figure 14:
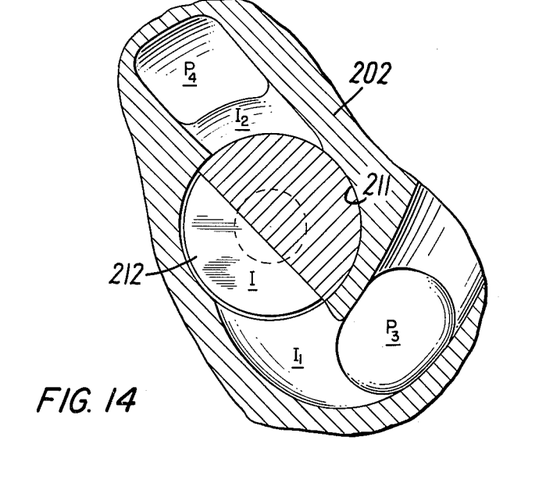
FIGURE 14 is an enlarged view of the repressurizing port and passage of the rotor of FIGURE 12, taken along the lines 14—14 and looking in the direction of the arrows.
Figure 16:
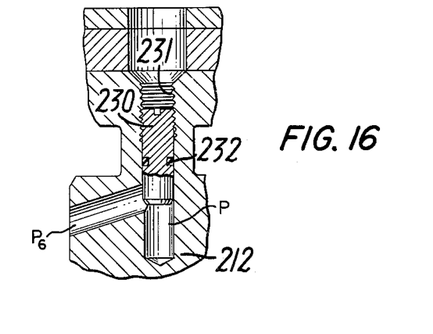
FIGURE 16 is an enlarged longitudinal view of the valve of FIGURE 11 showing the purge screw 230 and its association with related parts.

At the start of the drying cycle, let it be assumed that rotor 212 is in the 0° position shown in FIGURE 12. In this position, on the wet side of the dryer, passage $O_2$ of the manifold 202 is in alignment with port $P_6$ of the rotor 212, and passage $I_2$ is connected via passage $P_4$ with the purge port 219 and passage 218 of the rotor. Passage $O_1$ of the manifold 202 is in alignment with cutback O of the rotor, and thus is connected via O with the effluent gas port 205. Passage $I_1$ is in alignment with cutback I of the rotor. Hence, influent gas is directed from 209 via I and $I_1$ to tank III, and dry gas effluent is delivered via $O_1$ and O to the outlet port 205. Tank IV is on desorption, and dry gas effluent from tank III is bled off via port $P_5$ and passage P to port $P_6$ and passage $O_2$, to tank IV, for regeneration of spent adsorbent, leaving the tank via passage $I_2$ and being vented to the atmosphere via passage $P_4$ to port 219.

Control of the proportion of the dry gas effluent that is drawn off from the cutback O through the port $P_5$ is made possible by the purge screw 230 in passage P, best seen in FIGURE 12. The purge screw is threadably mounted in socket 231, and moves across and closes off a portion of the passage P, according to its adjustment in the socket. The O-ring seal 232 on the screw ensures a gas-tight seal of the screw in the socket 231.

When adsorption and desorption are complete, in about four minutes forty seconds, it is necessary to change over the flow between tanks III and IV so as to put tank III, which is now depleted, on the desorption or regeneration cycle, and tank IV, which is now fully regenerated, on the adsorption or drying cycle. Inasmuch as the desorption cycle is carried out at a lower pressure than the adsorption, it is necessary first to repressurize tank IV. This is accomplished in the next position of the rotor 212, and to reach this position, the rotor 212 is rotated through an arc of 90° clockwise, viewed from the actuating end of the rotor.

In this 90° position of the rotor 212, passages $I_1$ and $O_1$ continue in alignment with cutbacks I and O of the rotor ensuring a continued flow of wet gas influent from port 209 via I and $I_1$ to tank III, and of dry gas effluent from tank III via $O_1$ and O to port 205. Port 219 and passage 218 in the rotor are not in alignment with any passage in the manifold, and port $P_4$ is accordingly closed off. Thus, at this position of the rotor 212, the exit passage from tank IV is closed.

In this 90° position of the rotor, passage $P_5$ of the rotor is still in alignment with port $O_1$, but port $P_6$ is not in alignment. Repressurization passage R, and port $R_2$ are in alignment with $O_2$, ensuring a continuance of flow of dry gas from passage $O_1$ from tank III to passage $O_2$ leading to tank IV. Since the exit passage $P_4$ of tank IV is closed at rotor 212, the pressure in tank IV is built up, until it is equal with the pressure in tank III.

Cutback TT and fast timing passage $T_3$ in the rotor are now in alignment with the timing passage T of the manifold, so as to give an increased flow of gas to the timer block, from cutback O and $O_1$, and ensure a fast stroke of the piston, and so a short period for the repressurization cycle, a time not exceeding about 20 seconds, in most cases.

When repressurization is complete, the rotor 212 is rotated an additional 90°, so that it has now reached the 180° position from the starting point.

With the rotor 212 in this 180° position, indentation O is in alignment with passage $O_2$, and indentation I with passage $I_2$, as a result of which the wet gas effluent from the inlet port 209 now enters tank IV which is on the adsorption cycle, while dry gas effluent flows from tank IV via $O_2$ and O to the outlet port 205.

Passage 218 of the rotor, which connects with the purge port 219, is in alignment with passages $P_3$ and $I_1$ of the manifold, and thus tank III is now connected with the purge port. At the same time, port $P_5$ and passage P of the rotor are aligned with passage $O_1$ leading to tank III, so that dry gas effluent purge flow passes into tank III, and emerges via passages $O_1$ and $P_3$ to the purge port 219. Neither of the $T_3$ or $T_4$ passages of the rotor is in alignment with the fast timing passage T, and thus the fast timing circuit is not supplied with dry gas effluent in this cycle, which consequently is a long cycle, of the order of four minutes forty seconds.

Finally, at the conclusion of the adsorption and desorption cycle, for tanks III and IV, respectively, the rotor is rotated a further 90°, so that it is now 270° from the starting point. At this point, passage I of the rotor 212 continues in alignment with the passage $I_2$ of the plate and manifold, so that wet gas effluent continues to flow to tank IV from port 209, while passage $P_3$ is not aligned with passage 218 in the rotor, so that the purge flow entering tank III can no longer escape, and pressure is built up, preparatory to putting tank III on the adsorption cycle. At the same time, passage O of the rotor 212 is in alignment with passage $O_2$, continuing to supply dry gas effluent from tank IV to the dry gas outlet 205, and repressurization passage R, and port $R_2$ are in alignment with the passage $O_1$ of the plate and manifold, continuing the flow of dry gas effluent to tank III to repressurize it. Passage $T_4$ is in alignment with timing passage T, so as to supply gas from cutbacks O and TT to the fast timing circuit for a fast repressurization cycle, of the order of 20 seconds.

Finally, at the conclusion of this repressurization cycle, the rotor is rotated a further 90°, returning it to its 0° starting point, and the entire 360° drying cycle can now be repeated.

The following is claimed:

1. A pneumatic multiport rotary valve comprising, in combination, a housing having a plurality of ported passages for separate circulation of influent and effluent fluid distributed by the valve, a rotor rotatably mounted in the housing and provided with a plurality of ported fluid passages aligned at predetermined positions with the ported passages of the housing, pneumatic means operated by fluid flow from the valve for rotating the rotor between said predetermined successive positions to make selected connections with the ported passages of the housing, timing means operated by fluid flow operatively associated with the pneumatic means and constructed so that the rate of flow therefrom to the pneumatic means controls the timed sequence in which the pneumatic means rotates the rotor, and means for supplying an increased flow of fluid to the pneumatic means at predetermined positions of the rotor to shorten the time between predetermined successive positions of the rotor.

2. A pneumatic multiport rotary valve in accordance with claim 1 wherein the rotor is in the form of a rotary plate.

3. A pneumatic multiport rotary valve in accordance with claim 2 having two rotary plates, the peripheries of the plates being geared for rotation of one plate by the other.

4. A pneumatic multiport rotary valve in accordance with claim 1 wherein the rotor comprises a cylinder.

5. A pneumatic multiport rotary valve in accordance with claim 1 wherein the pneumatic means comprises means operatively connected with a piston reciprocated between spaced positions within a cylinder by fluid flow from the valve.

6. A pneumatic multiport rotary valve in accordance with claim 5 wherein the time required for the piston to make a stroke between the said spaced positions is controlled by the rate of flow of the fluid supplied by the timing means for operating the piston.

7. A pneumatic multiport rotary valve in accordance with claim 5 wherein reciprocation of the piston is effected by alternating application of fluid pressure from one side of the piston, while venting fluid on the other side of the piston by an exhaust valve.

8. A pneumatic multiport rotary valve in accordance with claim 7 wherein the exhaust valve comprises a reciprocating poppet operating between closed and open positions by movement of a stressed Belleville spring disc.

9. A pneumatic multiport rotary valve in accordance with claim 8 wherein the Belleville spring disc deflection curve at the closed position of the valve is just short of the point where the curve changes slope to a negative rate, and at the open position of the valve is still on the negative rate portion of the curve.

10. A pneumatic multiport rotary valve for timed distribution of influent fluid to a treating system and of effluent fluid from the treating system comprising, in combination, a mounting plate having a plurality of ported passages for separate circulation of influent and effluent fluid distributed by the valve, a head attached to the mounting plate and provided with a plurality of ported fluid passages for separate circulation of influent fluid and effluent fluid distributed by the valve, said passages opening on the side of the head facing the plate and disposed opposite the ported passages of the plate, a shear plate rotatably mounted between the head and the mounting plate having a plurality of ported fluid passages aligned with the passages of the head and the mounting plate, and connecting the same according to the position of the shear plate in a plurality of selected combinations, a shaft operatively connected with the rotary shear plate to rotate the same from one successive position to the next successive position for a selected combination of passages of the head and the mounting plate, pneumatic means operated by fluid flow from the valve for rotating the shaft and with it the shear plate between said predetermined successive positions to make selected connections between the ported passages of the housing and the plate, timing means operated by fluid flow operatively connected with the pneumatic means and constructed so that the rate of flow therefrom to the pneumatic means controls the timed sequence in which the pneumatic means rotates the shaft and shear plate, and means for supplying an increased flow of fluid to the pneumatic means at predetermined positions of the shear plate to shorten the time between predetermined successive positions of the plate.

11. A pneumatic multiport rotary valve in accordance with claim 10 wherein the means for rotating the shaft comprises a piston reciprocating within a cylinder, and means for supplying fluid from the valve successively to the one and then to the other side of the piston, to reciprocate said piston from the one end to the other end of the cylinder.

12. A pneumatic multiport rotary valve in accordance with claim 10 comprising two shear plates operatively connected the one to the other by a gear, the shaft being connected to one of the said plates, and the other being operated by rotation of the shaft-rotated plate.

13. A pneumatic multiport rotary valve comprising, in combination, a housing having a plurality of ported passages for separate circulation of influent and effluent fluid distributed by the valve, a recess in the housing into which the ported passages open, a cylindrical rotor rotatably mounted in the recess and provided with a plurality of ported fluid passages aligned at predetermined positions of the rotor with the ported passages opening onto the recess and connecting the same according to the position of the rotor in a plurality of selected combinations, pneumatic means operatively connected with the rotor to rotate the same from one successive position to the next successive position for a selected combination of passages of the housing and the rotor, timing means operated by fluid flow operatively connected with the pneumatic means and constructed so that the rate of flow therefrom to the pneumatic means controls the timed sequence in which the pneumatic means rotates the rotor, and means for supplying an increased flow of fluid to the pneumatic means at predetermined positions of the rotor to shorten the time between predetermined successive positions of the rotor.

14. A pneumatic multiport rotary valve in accordance with claim 13 wherein the periphery of the rotor is cut back, to form a passage for fluid flow between selected combinations of the passages.

15. A pneumatic multiport rotary valve comprising, in combination, a housing having a plurality of ported passages therethrough for separate circulation of influent and effluent fluid distributed by the valve, a rotor rotatably mounted in the housing and provided with a plurality of ported fluid passages aligned at predetermined positions with ported passages of the housing, a cylinder, a piston reciprocated between spaced positions within the cylinder by flow of fluid from the valve, and operatively connected with the rotor for rotating the rotor between said predetermined successive positions to make selected connections between the ported passages of the housing, and timing means arranged to control the rate of flow of fluid from the valve to the piston and thereby control the time required for the piston to make a stroke between the said spaced positions, and thus determined the timed sequence of rotations of the rotor, and means for supplying an increased flow of fluid from the valve to the piston at predetermined positions of the rotor, to shorten the time required for the piston to complete a stroke.

References Cited by the Examiner
UNITED STATES PATENTS

| | | | |
|---|---|---|---|
| 1,875,623 | 9/1932 | Longbotham | 137—624.14 |
| 1,926,168 | 9/1933 | Nylander | 137—624.14 XR |
| 2,327,046 | 8/1943 | Hunter | 137—624.14 |
| 2,385,151 | 9/1945 | Miller | 91—50 XR |
| 2,704,548 | 3/1955 | Ralston | 137—469 |
| 2,837,115 | 6/1958 | Bancroft | 137—609 XR |
| 2,888,946 | 6/1959 | Barron | 137—469 |
| 2,980,064 | 4/1961 | Norton | 91—318 XR |
| 2,988,108 | 6/1961 | Malinquist | 137—625.46 |
| 3,066,688 | 12/1962 | Young | 137—624.14 XR |
| 3,105,518 | 10/1963 | Kunz | 137—624.14 |

FOREIGN PATENTS 463,380   12/1913   France.

ISADOR WEIL, *Primary Examiner.*

WILLIAM F. O'DEA, *Examiner.*